United States Patent
Kotaru et al.

(10) Patent No.: US 12,557,176 B2
(45) Date of Patent: Feb. 17, 2026

(54) DELIVERING CONSUMABLE CONTENT TO A WEARABLE USER EQUIPMENT

(71) Applicant: Microsoft Technology Licensing, LLC, Redmond, WA (US)

(72) Inventors: Manikanta Kotaru, Kenmore, WA (US); Song Wang, San Diego, CA (US); Bozidar Radunovic, Cambridge (GB); Xenofon Foukas, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 18/307,702

(22) Filed: Apr. 26, 2023

(65) Prior Publication Data

US 2024/0365427 A1    Oct. 31, 2024

(51) Int. Cl.
*H04W 76/28* (2018.01)
*H04L 65/60* (2022.01)
*H04W 28/02* (2009.01)

(52) U.S. Cl.
CPC ............. *H04W 76/28* (2018.02); *H04L 65/60* (2013.01); *H04W 28/0247* (2013.01)

(58) Field of Classification Search
CPC .... H04W 76/28; H04W 28/0247; H04L 65/60
See application file for complete search history.

(56) References Cited

U.S. PATENT DOCUMENTS

2023/0064242 A1*    3/2023   Kim ....................... G06T 7/277

* cited by examiner

*Primary Examiner* — Shawn D Miller
(74) *Attorney, Agent, or Firm* — Ray Quinney & Nebeker P.C.; James S. Bullough (57) ABSTRACT

The present disclosure generally relates to improving energy efficiency of reality-based headsets by enabling discontinuous transmission (DRX) without significantly reducing the quality of experience (QoE) of a user of the headsets when consuming digital content presented thereon. The present disclosure includes a predictive content management system that obtains consumable content (including predictive content) to be consumed on a wearable UE. The system receives, from a radio access network (RAN), discontinuous reception (DRX) configuration information indicating active and inactive periods with which the UE and RAN may communicate. The system additionally facilitates stacking consumable content, delivering the consumable content based on the DRX configuration information, and performing certain latency masking features to avoid loss of quality of the presented content.

20 Claims, 6 Drawing Sheets

DELIVERING CONSUMABLE CONTENT TO A WEARABLE USER EQUIPMENT

BACKGROUND

Recent years have seen a rise in the use of computing devices (e.g., mobile devices, personal computers, server devices, wearable devices, Internet of Things (IoT) devices) to receive, store, edit, display, and otherwise present digital data to end-users. Indeed, it is now common for individuals to consume digital content in a variety of forms on user devices including wearable devices (e.g., wearable headsets). In many cases, the content that is consumed on these end-user devices is generated and provided via one or more remote computing devices, such as servers of a cloud computing system.

As wearable devices have grown in popularity and improved in capability, demand for low-latency delivery of digital content has followed. In addition, as mobile telecommunications networks have become a capable resource in delivering digital content to mobile devices, this delivery of high-quality content has become more common. In particular, fifth generation (5G) technologies have enhanced the ability of computing devices to generate and deliver high quality digital content to mobile devices, and particularly to wearable devices.

While advancement of telecommunication technologies as well as the increased capabilities of wearable devices have provided significant advancements in the field of virtual reality (VR), augmented reality (AR), and mixed reality (MR) devices, these enhancements in the field of reality-based content have resulted in a number of problems and drawbacks. For example, delivery of high-quality content often requires utilization of significant networking and processing resources, causing wearable devices to drain battery power at an accelerated rate. Moreover, efforts to reduce the consumption of battery power often results in the loss of quality in the content ultimately consumed by an end-user.

These and other problems exist in connection with delivering and consuming digital content on mobile devices, and particularly on wearable devices.

SUMMARY

One or more embodiments described herein relate to a method for delivering digital content to a wearable user equipment (UE). More specifically, the method may include obtaining consumable content to be consumed on the wearable UE wherein at least a portion of the consumable content comprises predictive consumable content. The method may further include receiving, from a radio access network (RAN), discontinuous reception (DRX) configuration information, the DRX configuration information comprising communication instructions for communicating with the wearable UE. The method may further include stacking the consumable content based on the received DRX configuration information and transmitting the stacked consumable content to the wearable UE.

In a further embodiment, a system for delivering digital content to a wearable user equipment (UE) is provided. The system includes a wearable UE configured to provide pose information. The system further including a radio access network (RAN) configured to provide discontinuous reception (DRX) configuration information, wherein the DRX configuration information comprises communication instruction for communicating with the wearable UE. The system further includes a server device configured to generate consumable content to be consumed on the wearable UE based on the pose information, wherein at least a portion of the consumable content comprises predictive consumable content, and wherein the server device is further configured to stack the consumable content based on the DRX configuration information and transmit the stacked consumable content to the wearable UE.

In yet another embodiment, a method for delivering digital content from an edge network on a cloud computing system to a wearable user equipment (UE) is provided. The method comprising obtaining consumable content to be consumed on the wearable UE, wherein at least a portion of the consumable content comprises predictive consumable content. The method further including receiving from a radio access network (RAN) located at the edge network on a cloud computing system discontinuous reception (DRX) configuration information, the DRX configuration information comprising communication instructions for communicating with the wearable UE. The method further comprising stacking the consumable content based on the received DRX configuration information and transmitting the stacked consumable content to the wearable UE.

DETAILED DESCRIPTION

This disclosure generally relates to delivering digital content to a wearable user equipment (UE) in a manner that improves battery life on the wearable UE without significantly reducing the quality with which the digital content is presented on an interface of the wearable UE. In particular, as will be discussed in further detail below, the systems described herein provide features and functionality for improving energy efficiency of delivering and presenting reality-based content by enabling discontinuous transmission (DRX) and aggregating predictive content in a manner that masks latency caused by the use of DRX techniques.

As an illustrative example, the present disclosure describes a predictive content management system that performs features and functionalities described herewith.

For example, the predictive content management system obtains consumable content to be consumed on a wearable UE. As will be discussed below, at least a portion of this consumable content is predictive content (e.g., based on predicted movement of an individual wearing the UE). The predictive content management system additionally receives DRX configuration information from a radio access network (RAN). Based on the received DRX configuration information, the predictive content management system stacks the consumable content. The predictive content management system additionally transmits the stacked consumable content to the wearable UE.

The present disclosure includes a number of practical applications that provide benefits and/or solve problems associated with facilitating communication of content between a server device and a wearable UE. Some example benefits are discussed herein in connection with various features and functionalities provided by predictive content management system. It will be appreciated that benefits discussed herein are provided by way of example and are not intended to be an exhaustive list of all possible benefits of the predictive content management system.

For example, by communicating DRX configuration information between a RAN and a server device, the predictive content management system can reduce the amount of energy expended as a result of channel monitoring by the UE. For example, in many conventional systems for delivering reality-based content, a UE remains awake in order to monitor a physical downlink control channel (PDCCH) for every subframe. This monitoring ensures that the UE is aware of when the network will transmit data for the respective subframes. While effective at ensuring proper communication between the UE and network, this continuous channel monitoring causes the wearable UE to consume significant power (e.g., battery) resources. In contrast to these conventional approaches, the systems described herein select specific time intervals for delivering content to the UE, thus reducing energy consumption at the UE. This reduction in energy consumption can significantly extend the life of the battery powering the wearable UE.

In addition, by generating and providing predictive content to a wearable UE, the systems described herein may achieve the above power savings without significantly degrading the quality of digital content delivered to the wearable UE. For example, in conventional systems that utilize DRX methods, a UE may save power by remaining inactive during certain periods of time. While reducing the time that the UE remains active decreases power consumption, this intermittent activity can cause latency in delivery of the digital content to the UE. As will be discussed in further detail below, the systems described herein may avoid many of the negative impacts of traditional DRX techniques by generating and providing predictive consumable content to be consumed during one or more inactive periods of the DRX cycle. Indeed, the predictive content management system can utilize predictive pose information received from a UE to generate predictive consumable content to be delivered to the UE. By generating predictive consumable content, the UE may not require continuous transmission between the server device and the UE and hence saves power.

The systems described herein additionally facilitate delivery of high quality content while employing DRX techniques by stacking content and allocating bandwidth resources to enable the system to communicate content during the active DRX period. In particular, as will be discussed in further detail below, a RAN may allocate necessary quantities of resources (e.g., bandwidth) based on the quantity of consumable content the system requests to transmit to the UE. By allocating required resources to enable the system to transmit content during the active DRX period, the system is able to deliver predictive consumable content slightly in advance of when an end-user is expected to consume it.

Moreover, in one or more embodiments, the system is implemented in an edge network that utilizes 5G technology for transmitting consumable content to the wearable UE. For example, in one or more embodiments, a 5G RAN is implemented as open RAN (O-RAN) at the edge network utilizing cloud infrastructure. By implementing the 5G resources (e.g., RAN components) at the edge network, the overall latency of the system may be further reduced. While one or more embodiments described herein relate specifically to a 5G communication network (e.g., a 5G mobile communication network), it will be appreciated that features and functionality in connection with utilizing a DRX approach to delivering digital content as well as generating and delivering predictive content may be used in connection with previous or future generations of telecommunications networks.

As illustrated in the foregoing discussion and as will be discussed in further detail herein, the present disclosure utilizes a variety of terms to describe features and advantages of methods and systems described herein. Some of these terms will be discussed in further detail below.

As used herein, a "wearable user equipment" (or simply, "user equipment (UE)") may refer to a wearable electronic device capable of presenting digital content to a user of the wearable electronic device. In one or more embodiments described herein, a wearable UE has a head-mounted display (HMD). Examples of wearable UEs include virtual reality (VR) headsets, augmented reality (AR) headsets, and mixed-reality (MR) headsets. These different types of headsets may be referred to herein as reality-based headsets (or reality-based UEs). These systems are designed to present an individual with reality-based content, and to create a sense of presence in the created environment for the user of the wearable UE. With these immersive realities often presented in conjunction with physical movement of a user, the computer-generated content is often presented in real-time.

As used herein, "consumable content" may refer to computer-generated digital content, such as digital data that makes up a computer-generated environment (in VR) or computer-created objects (in AR or MR) to be presented by the wearable UE. In one or more embodiments, the consumable content includes a combination of visual content and audio content. In one or more embodiments, at least a portion of the consumable content includes predictive consumable content. Examples of these respective types of content will be discussed in further detail below.

As used herein, a "cloud computing system" refers to a network of connected computing devices that provide various services to computing devices (e.g., wearable UEs). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. Moreover, in one or more embodiments a data network may be implemented on the same or on a different cloud computing network as the portion of the cellular network.

In one or more embodiments, the cloud computing system includes one or more edge networks. As used herein, an "edge network" may refer to an extension of the cloud computing system located on a periphery of the cloud computing system. The edge network may refer to a hierarchy of one or more devices that provide connectivity to devices and/or services on a datacenter within a cloud computing system framework. An edge network may provide a number of cloud computing services on hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system. In one or more embodiments described herein, server devices (e.g., reality-based content application server(s)) that generate and provide consumable content to a wearable UE is implemented on a server device of the edge network.

As used herein, a radio access network (or "RAN") may refer to a 3GPP defined RAN or an open RAN (O-RAN) that is implemented within the framework of a cellular network. In one or more embodiments described herein, a RAN is implemented at least partially on the cloud computing system. In one or more implementations, the RAN or multiple RAN components are implemented on an edge network. As used herein, RAN components may refer to any device or functional module of the RAN that provides radio access functionality on a cellular network. RAN components may refer to physical components implemented at a RAN site, such as a base station or set of co-located base stations. RAN components may also refer to virtualized components, such as a service instance deployed on an edge network or datacenter of a cloud computing system. By way of example and not limitation, RAN components may refer to routers, firewalls, antennas, or any device or other functional component (e.g., a virtualized service) that facilitates a connection between an endpoint (e.g., wearable UE) and a core network.

As user herein, "discontinuous reception (DRX)" is a transmission mechanism in which a UE selectively listens to transmissions from a network during an active DRX period while engaging a sleep mode (e.g., inactive mode) during other non-active periods. This active DRX period and inactive DRX period is referred to herein as a DRX cycle, with consecutive DRX cycles repeating one after another. A DRX cycle length, an active DRX period length, and an inactive DRX period length may be arbitrarily selected or configurable based on an application or the hardware of the telecommunication environment. By way of example, a DRX cycle length may be 40 ms, consisting of 10 ms of active DRX period and 30 ms of inactive DRX period. In another example, the DRX cycle may be 30 ms, consisting of 20 ms active DRX period and 10 ms of inactive period. As noted above, the DRX periods may be configurable or modified to accommodate any number of applications and/or hardware specifications.

Figure 1:
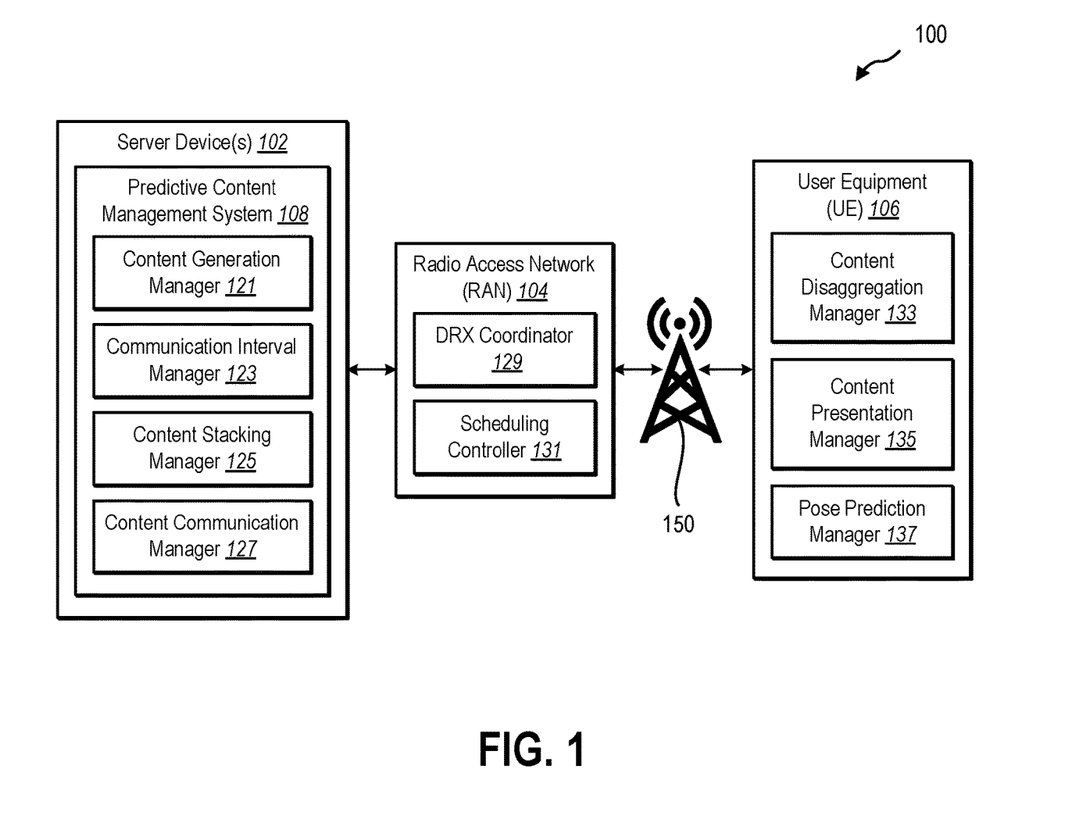
FIG. 1 illustrates an example environment showing implementation of a predictive content management system in accordance with one or more embodiments.

Additional detail will now be discussed in connection with example figures that illustrate various features and functionalities of the systems described herein. For example, FIG. 1 illustrates an example environment 100 including a server device(s) 102, a radio access network (RAN) 104, and a wearable user equipment (UE) 106 (or simply "UE 106"). As shown in FIG. 1, and as will be discussed in connection with examples herein, the RAN 104 may communicate with the server device(s) 102 via a communication interface. The RAN 104 may additionally communicate with the UE 106 via a base station 150. While FIG. 1 illustrates an example in which the RAN 104 has separate components from the base station 150, in one or more embodiments, components of the RAN 104 and/or base station may be implemented on server devices of a cloud computing system (e.g., an edge network of the cloud computing system).

As shown in FIG. 1, in one or more embodiments, the server device(s) 102 includes an application server (e.g., a rendering server) that generates and provides consumable content to the UE 106. Indeed, as will be discussed in connection with one or more embodiments herein, the server device(s) 102 includes a predictive content management system 108 that delivers consumable content to a UE 106 in a manner that extends the life of a power source on the UE 106 while also preserving the quality of the content that is displayed or otherwise presented on the UE 106. In one or more embodiments, the server device(s) 102 is located on an edge network. In one or more embodiments, the RAN 104 is an open RAN (O-RAN) located on the edge network.

Additional detail will now be discussed in connection with each of the respective devices 102, 104, 106 shown in FIG. 1. For example, the UE 106 may refer to a wearable UE having a head-mounted display (HMD) that renders immersive reality-based (e.g., VR, AR, MR) content. As shown in FIG. 1, the UE 106 may include a number of components for performing various tasks discussed herein. For example, the UE 106 may include a content disaggregation manager 133, a content presentation manager 135, and a pose prediction manager 137. Additional detail will be discussed in connection with each of these components in connection with one or more embodiments described herein.

In one or more embodiments, the content disaggregation manager 133 is tasked with un-stacking, disaggregating, or otherwise processing received consumable content (e.g., stacked consumable content) for the purpose of presenting the digital content via an interface of the UE 106. For example, as will be discussed in further detail below, the UE 106 may receive consumable content from a rendering server having the predictive content management system 108 implemented thereon during an active DRX period. As will be discussed in further detail below, the stacked consumable content may be received at the UE 106 and disaggregated or otherwise unstacked by the content disaggregation manager 133 prior to presenting the consumable content thereon.

Upon un-stacking the consumable content, the content presentation manager 135 causes the UE 106 to present consumable content via an interface of the UE 106 (e.g., on the HMD). For example, the content presentation manager 135 may present a full virtual environment on the HMD, or it may present some virtual objects combined in the real-world environment on the HMD. As will be discussed in further detail below, the content presentation manager 135 may present a specific view of the consumable content including some portion of predictive consumable content based on current pose data of the UE 106.

The pose prediction manager 137 collects movement and position data (e.g., an orientation) of the UE 106 to be used in predicting a future position (or a range of possible positions) of the UE 106 at some point in the very near future (e.g., less than 100 ms, depending on the latency provided by the server device(s) 102). For example, the pose prediction manager 137 may collect movement and orientation information from various sensors on or connected to the UE 106 (e.g., gyroscope, motion sensor, etc.) and use various models (e.g., statistical models, machine learning models) to predict a range of near-future movements and orientations of the UE 106.

In one or more embodiments, the UE 106 is configured to generate and transmit pose information to a predictive content management system 108 located in one or more server devices 102. In one or more embodiments, the pose information may include current pose information and predictive pose information calculated by the pose prediction manager 137. Indeed, in one or more embodiments, the pose prediction manager 137 locally detects or otherwise determines current pose information (e.g., a current position) and determines a predicted range of pose information. Alternatively, in one or more embodiments, the pose prediction manager 137 detects or otherwise determines current pose information and provides the current pose information to the predictive content management system 108 for use in determining a predicted range of the pose information.

As shown in FIG. 1, the predictive content management system 108 includes a number of components thereon tasked with performing features and functionality of the predictive content management system 108 in accordance with one or more embodiments described herein. For example, as shown in FIG. 1, the predictive content management system 108 includes a content generation manager 121, a communication interval manager 123, a content stacking manager 125, and a content communication manager 127. While the example shown in FIG. 1 shows an implementation of the predictive content management system 108 in which the components 121-127 are implemented on a single device, it will be appreciated that one or more of the components 121-127 may be implemented across multiple devices.

As an example, in one or more embodiments, the content generation manager 121 and the content stacking manager 125 may be implemented on the same or across different server devices. In addition, while not shown in FIG. 1, one or more components of the predictive content management system 108 may be implemented on a similar device (or on a similar set of devices, such as a common edge network) as components of the RAN 104. In addition, some of the features described herein in connection with individual components may be performed by different components or in cooperation with other components of the predictive content management system 108.

As mentioned above, the predictive content management system 108 includes a content generation manager 121. The content generation manager 121 may, in one or more embodiments, use the received pose information (e.g., current and/or predicted pose information) to generate consumable content for the UE 106. As will be discussed in further detail below, the content generation manager 121 may generate consumable content including a combination of non-predictive and predictive content. Additional information in connection with the consumable content will be discussed in connection with examples shown in FIGS. 3A-3C.

As further shown in FIG. 1, the predictive content management system 108 includes a communication interval manager 123. The communication interval manager 123 may be tasked with obtaining DRX interval information from the RAN 104. For example, in one or more embodiments, the communication interval manager 123 receives DRX interval information including timing data associated with specific intervals over which the predictive content management system 108 can communicate consumable content to the UE 106.

In one or more embodiments, the predictive content management system 108 includes a content stacking manager 125. The content stacking manager 125 may, in one or more embodiments, utilize DRX configuration information to stack (e.g., aggregate) the consumable content generated by the content generation manager 121 to be transmitted during an active period of the DRX cycle, from the RAN 104 to the UE 106. For example, if the DRX cycle length is 30 ms, the content stacking manager 125 may stack consumable content to last at least 30 ms for each DRX cycle.

As shown in FIG. 1, the predictive content management system 108 further includes a content communication manager 127. The content communication manager 127 may cause the server device(s) 102 to deliver the stacked consumable content to the RAN 104. In one or more embodiments, the communication manager 127 utilizes the RAN 104 to communicate the stacked consumable content to the UE 106 in accordance with a DRX cycle and based on bandwidth that has been allocated for the purpose of communicating the stacked consumable content.

In one or more embodiments, the RAN 104 includes a DRX coordinator 129. The DRX coordinator 129 manages the DRX cycle between components of the environment 100 (e.g., between the RAN 104 and the UE 106). In one or more embodiments, the DRX coordinator 129 may be a RAN intelligent controller (RIC). The DRX coordinator 129 may receive input from the predictive content management system 108 regarding the requirements for consumable content delivery. For example, the DRX coordinator 129 may choose a longer or shorter DRX cycle for transmitting the consumable content to the UE 106 based on the communication from the communication interval manager 123. In another example, the DRX coordinator 129 may choose a particular duration of a DRX active period within the DRX cycle based on the communication from the communication interval manager 123. In one or more embodiments, the DRX coordinator 129 may communicate to the predictive content management system 108 DRX configuration information, wherein the DRX configuration information includes communication instructions for communicating with the UE 106. In one or more embodiments, the DRX configuration information includes one or more of a length of the DRX cycle, a length of an active period of the DRX cycle, a length of an inactive period of the DRX cycle, and synchronization information for the start of the DRX cycle.

As further shown in FIG. 1, the RAN 104 further includes a scheduling controller 131. The scheduling controller 131 is configured to allocate enough communication resources for each DRX cycle to transmit all the consumable content it receives during a DRX inactive period. For example, the scheduling controller 131 may allocate higher quantity of communication resources (e.g., bandwidth) for the transmission when the amount of consumable content is high, and a lower quantity of resources when the amount of consumable content is low. The quantity of resources allocated may include the size of the data and the speed of the data. For example, the quantity of resources may, in one or more embodiments, be 5 Mbps (megabits per second).

Figure 2A:
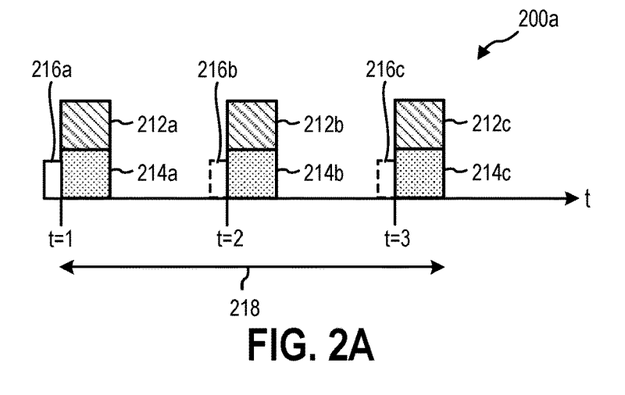
FIG. 2A illustrates an example generation of consumable content to be delivered to a wearable UE in accordance with one or more embodiments.

Additional information will now be discussed in connection with more specific examples in which consumable content (e.g., including predictive content) is generated, stacked, and communicated in accordance with DRX interval information. For example, FIG. 2A illustrates a first example 200a of generated consumable content to be delivered to the UE 106, according to one or more embodiments. The consumable content may be created by the predictive content management system 108 on server device(s) 102. As shown in FIG. 2A, consumable content may be created at time t=1 based on pose information 216a received from the UE 106. In the embodiments shown in FIG. 2A, the consumable content created based on pose information 216a consists of visual content 212a and audio content 214a. In one or more embodiments, the consumable content may include only visual content. Other implementations may include any number of consumable content types (e.g., audio content, visual content, haptic content) that a user may experience or otherwise consume.

At time t=2, consumable content 212b and 214b may be created based on pose information 216b. Similarly, at time t=3, consumable content 212c and 214c are created based on pose information 216c. As previously discussed, the pose information 216a, 216b, and 216c may include current pose information and predictive pose information received from the UE 106. In one or more embodiments, the pose information includes first pose information 216a detected by the UE 106 and predictive information generated by the predictive content management system 108 or determined and provided by the UE 106.

In one or more embodiments, the consumable content 212a, 214a, 212b, 214b, 212c, and 214c is created based on first pose information 216a (e.g., present or current pose information) received from the UE 106. In the example shown in FIG. 2A-2C, the consumable content 212a, 214a, 212b, 214b, 212c, and 214c created during the DRX cycle 218 (e.g., a single DRX cycle) includes predictive consumable content for three time periods spanning a length of a one DRX cycle. For example, if the length of a DRX cycle is 3 ms, where the active DRX period is 1 ms, the consumable content 212a and 214a created at t=1, will be presented by the UE 106 at t=4 (e.g., at the beginning of the next DRX cycle). Similarly, the consumable content 212b and 214b created at t=2 may be presented by the UE 106 at t=5 (e.g., the second period of the next DRX cycle) and the consumable content 212c and 214c created at t=3 may be presented by the UE 106 at t=6 (e.g., the third period of the next DRX cycle). Other implementations may incorporate different numbers of time periods within respective DRX cycles.

Figure 2B:
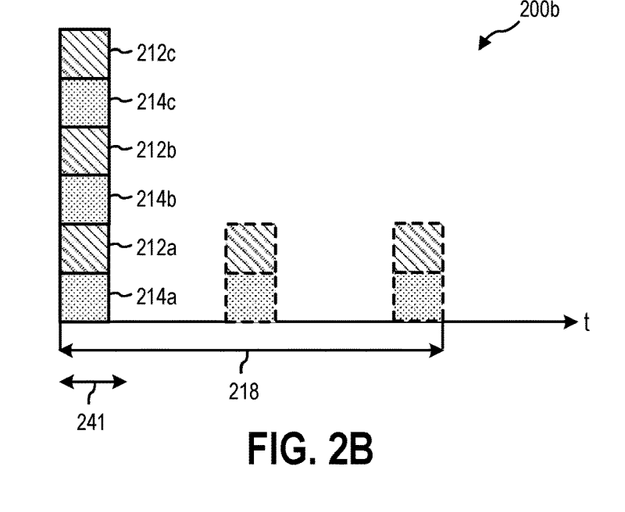
FIG. 2B illustrates an example stacking of consumable content in accordance with a DRX cycle prior to delivering the stacked content to a wearable UE in accordance with one or more embodiments.

FIG. 2B illustrates a second example 200b showing stacked consumable content for DRX transmission to the UE 106, according to one or more embodiments. The consumable content 212a, 214a, 212b, 214b, 212c, and 214c may correspond to similar consumable content discussed above in connection with FIG. 2A. In this example, the consumable content is stacked and selectively transmitted to the UE 106 during the active DRX period 241 of the DXR cycle 218 (while specifically avoiding delivery of content during inactive periods). As previously discussed, the content stacking manager 125 may stack the consumable content generated by the content generation manager 121 at the predictive content management system 108 and content communication manager 127 may deliver the stacked consumable content to the RAN 104 to be delivered to the UE 106. Based on the amount of data and the DRX configuration information the scheduling controller 131 of the RAN 104 may select an appropriate bandwidth to deliver the consumable content to the UE 106.

Figure 2C:
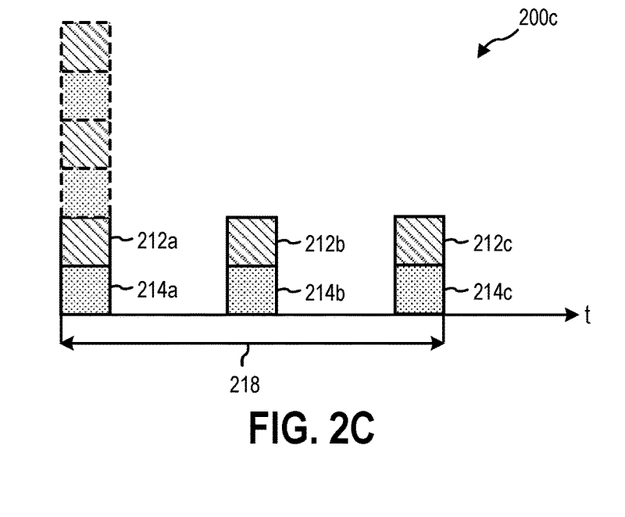
FIG. 2C illustrates an example disaggregation of the stacked consumable content in accordance with one or more embodiments.

FIG. 2C illustrates a third example 200c showing deloading, disaggregating, or otherwise unstacking the stacked consumable content at the UE 106. As noted above, the UE 106 (e.g., the content disaggregation manager 133 on the UE 106) is configured to disaggregate, de-load, or otherwise unstack the respective portions of different consumable contents, 212a and 214a, 212b and 214b, and finally 212c and 214c, for three different time periods as shown by FIG. 2C. The consumable content may then be presented via an interface of the UE 106 (e.g., the HMD) during the next DRX cycle 218 while the content generation manager 121 of the predictive content management system 108 is generating new consumable content based on new pose information received from the UE 106.

By stacking the consumable content in the manner shown in FIGS. 2A-2C, the predictive content management system 108 facilitates delivery of consumable content selectively over an active period to be viewed or otherwise consumed over a range of time that may span both active and inactive intervals of a DRX cycle. This allows delivery of consumable content while also reducing consumption of batter power on the UE 106. As will be discussed below, the predictive content management system 108 enables this battery savings to occur while still preserving quality of the consumable content that is displayed or otherwise presented on the UE 106.

Figure 3A:
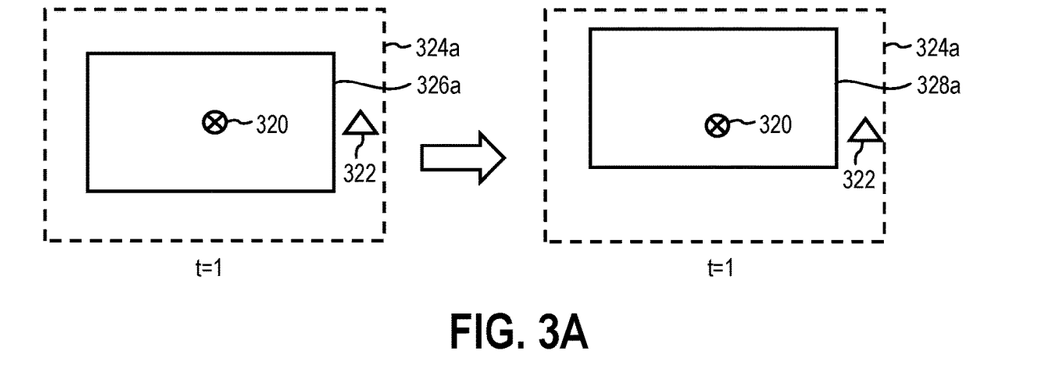
FIG. 3A-3C illustrates example views of consumable content presented at a wearable UE, according to one or more embodiments.
Figure 3B:
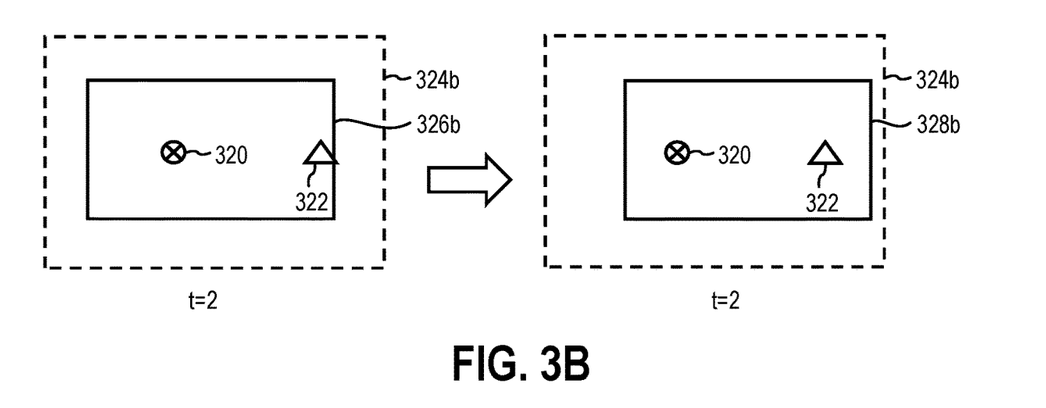
Figure 3C:
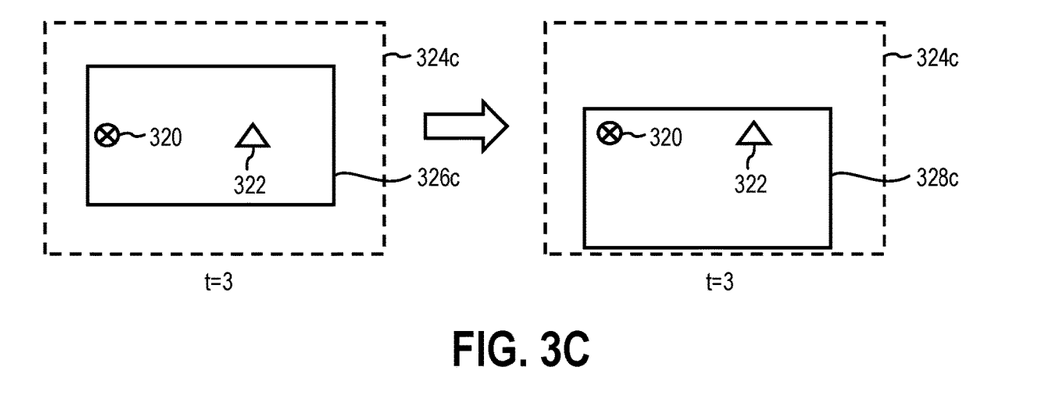

Additional information will now be discussed in connection with masking certain latency effects that may be introduced as a result of stacking the consumable content while also selectively delivering the consumable content during the active periods of the DRX cycle(s). In particular, FIG. 3A-3C illustrates an example combination of predictive consumable content and current consumable content presented at the UE 106 at three different time periods, according to one or more embodiments. As discussed above, based on the pose information received from the UE 106, the predictive content management system 108 may create three separate consumable contents corresponding to different moments in time over a DRX cycle. In particular, as shown in FIGS. 3A-3C, the predictive content management system 108 may generate first consumable content 324a for a first time (t=1), second consumable content 324b for a second time (t=2), and third consumable content 324c for a second time (t=3). In this example, each of the consumable contents 324a-c may be delivered to the UE 106.

As shown in FIGS. 3A-3C, each of the consumable contents 324a-c includes a field-of-view (FOV) and a buffer of consumable content including predictive content based on potential movement of the FOV of the UE. In this example, the predictive content management system 108 may determine or predict a field-of-view (FOV) for each three different time periods as first FOV 326a, second FOV 326b, and third FOV 326c, respectively. In one or more embodiments, instead of delivering specifically the predictive FOVs 326a, 326b, and 326c, the predictive content management system 108 will transmit the slightly larger range of consumable contents 324a-c, which include consumable content outside of the predictive FOVs.

In the example shown in FIG. 3A-3C a first virtual object 320 and a second virtual object 322 are generated or rendered within a virtual environment (e.g., a displayed environment) seen through the wearable UE 106. Based on the predictive FOV 326a at t=1, the first virtual object 320 is shown at the middle of the screen and the second virtual object 322 is shown outside of the predictive FOV 326a. However, the second virtual object 322 is included in the transmitted consumable content 324a that is transmitted to the UE 106 for t=1. The actual FOV 328a at t=1 is slightly above the predictive FOV 326a at t=1, as the first virtual object 320 is slightly lower in the actual FOV 328a than in the predictive FOV 326a. The transmitted consumable content 324a, however, covers this and thus the UE 106 is able to present the content covering the actual FOV 328a.

At t=2, the content generation manager 121 provides a predictive FOV 326b that now covers both the first virtual object 320 and the second virtual object 322. Similarly, as in the FOVs for t=1, the predictive content management system 108 transmits a consumable content 324b that comprises consumable content outside of the predictive FOV 326b to the UE 106. As shown in FIG. 3B, the actual FOV 328b at t=2 is slightly more right than the predictive FOV 326b, but similarly as in t=1, the transmitted consumable content 324b cover content outside of the predictive FOV 326b at t=2. As shown by FIG. 3b, the actual FOV 328b includes both the first virtual object 320 and the second virtual object 322, but while the predictive FOV 326b at t=2 had the second virtual object 322 placed close to the boarder of the predictive FOV 326b, in the actual FOV 328b there is space between the second virtual object 322 and the boarder of the actual FOV 328b.

At t=3, the predictive content management system 108 provides a predictive FOV 326C that covers both the first virtual object 320 and the second virtual object 322. Similarly, as before, the predictive content management system 108 transmits a consumable content 324c that comprises consumable content outside of the predictive FOV 326c to the UE 106. The actual FOV 328c at t=3 is slightly more downwards than the predictive FOV 326c, but similar to earlier examples, the transmitted consumable content 324c covers content outside of the predictive FOV 326c at t=3. As shown by FIG. 3C, the actual FOV 328c includes both the first virtual object 320 and the second virtual object 322, but while the predictive FOV 326c at t=3 had both placed horizontally at the middle of the predictive FOV 326c, in the actual FOV 328c they are both close to the top of the actual FOV 328c.

By generating this consumable content that includes both the consumable content that is predicted to be within a current FOV of the UE interface as well as a buffer of consumable content to compensate for possible movement or change in position of the UE over brief periods of time, the predictive content management system 108 is able to compensate for potential latency introduced by stacking the consumable content prior to delivery of the stacked content to the UE. Indeed, by generating and delivering consumable content that includes an area of display beyond a current or predicted FOV, the predictive content management system 108 provides the UE with additional consumable content that the UE can use in the event that a user moves their head or the position and/or orientation of the UE changes between DRX cycles.

It will be noted that the above-benefits are further amplified and more easily achieved in telecommunications environments (e.g., 5G mobile networks and future generations of mobile networks) in which the rendering server is implemented on an edge network or other device(s) that has proximity to the UE (and therefore lower latency). For example, where the predictive content management system 108 is implemented on an edge network (e.g., a server node on the edge), and is able to provide faster communication of consumable content than a server implemented on a datacenter or other more remote location, the predictive content management system 108 can deliver consumable content that includes content within a present FOV as well as a buffer of predictive content without a significant risk that the UE will move outside of a predictive range of consumable content that is delivered to the UE. Thus, the features and functionality of the predictive content management system 108 are particularly beneficial in modern telecommunications systems and using the framework of modern cloud computing system in which server devices are often implemented at locations proximate to the end-user device(s) (e.g., the wearable UE).

Figure 4:
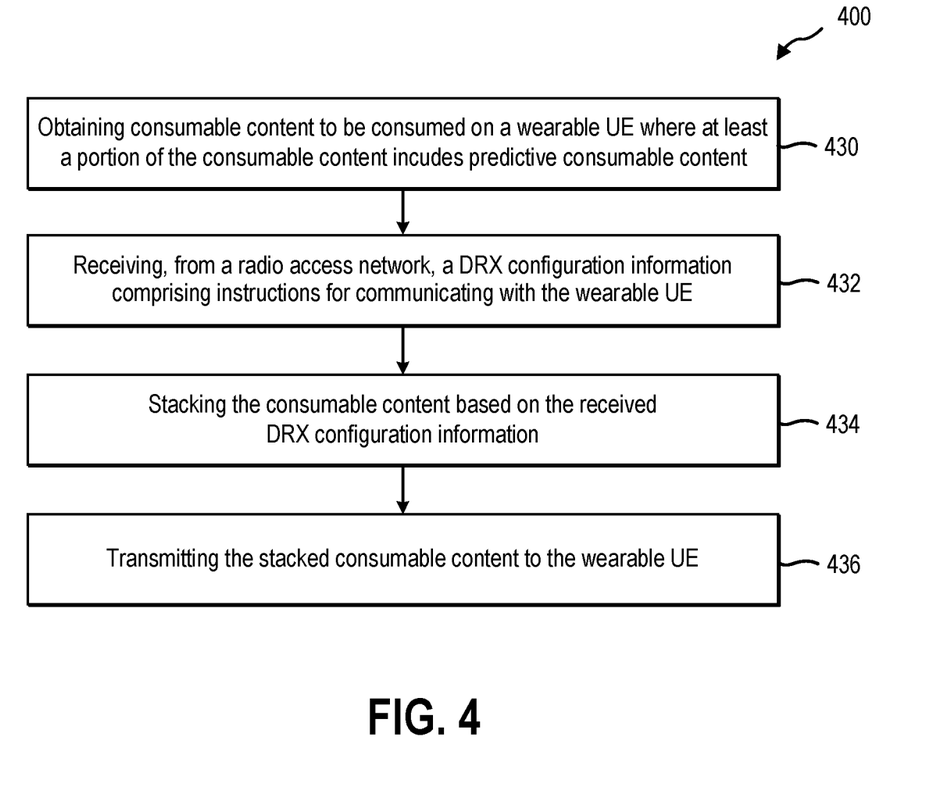
FIG. 4 illustrates a series of acts for implementing delivery of digital content to a wearable UE, according to one or more embodiments.
Figure 5:
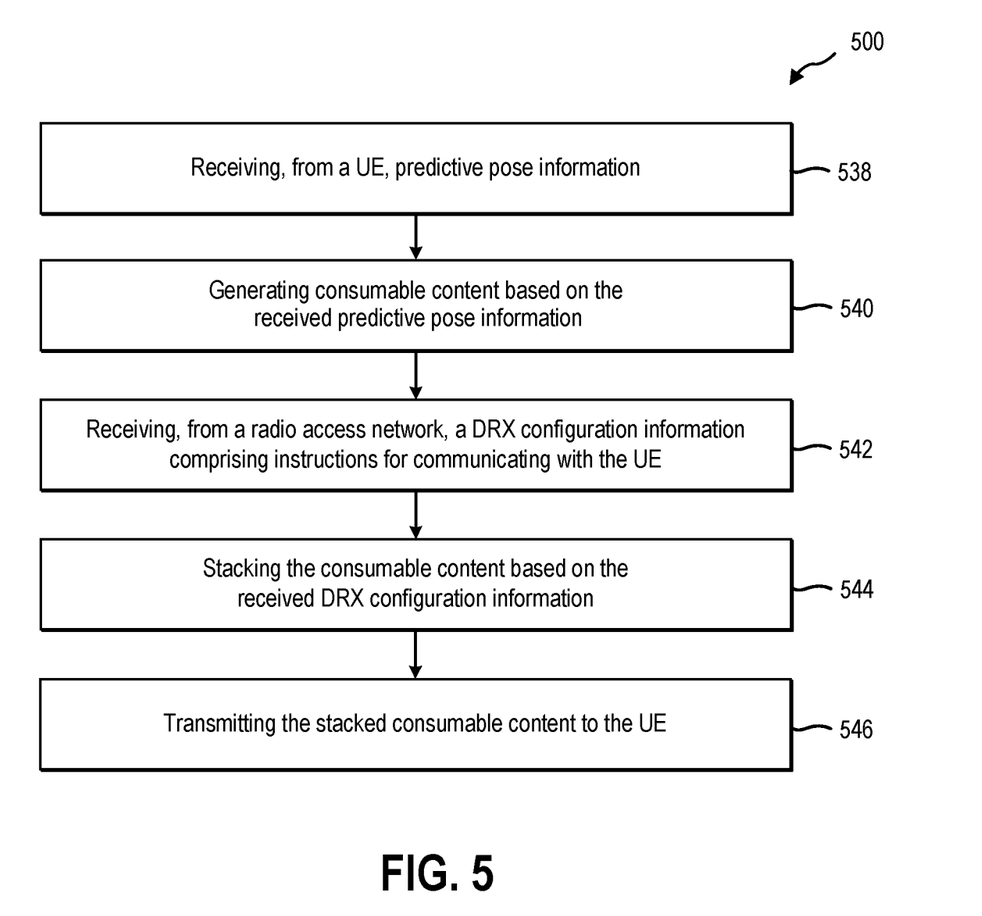
FIG. 5 illustrates a series of acts for implementing delivery of digital content to a wearable UE, according to one or more embodiments.

Turning now to FIGS. 4-5, these figures illustrates example flowcharts including series of acts for generating consumable content (including predictive consumable content) and delivering the consumable content during active periods of a DRX cycle. While FIGS. 4-5 illustrate acts according to one or more embodiments, alternative embodiments may omit, add to, reorder, and/or modify any of the acts shown in FIGS. 4-5. The acts of FIGS. 4-5 can be performed as part of a method. Alternatively, a non-transitory computer-readable medium can comprise instructions that, when executed by one or more processors, cause a computing device to perform the acts of FIGS. 4-5. In still further embodiments, a system can perform the acts of FIGS. 4-5.

For example, FIG. 4 illustrates a series of acts 400 for implementing delivery of digital content to a wearable user equipment, according to one or more embodiments. The digital content may be a full virtual environment or a combined real-world and computer-generated environment. As shown in FIG. 4, the series of acts 400 may include an act 430 of obtaining consumable content to be consumed on a wearable UE where at least a portion of the consumable content includes predictive consumable content. In one or more embodiments, the consumable content is one or more of (1) mixed reality content to be presented via a mixed reality interface (e.g., through the HMD) of the UE, (2) augmented reality content to be presented via an augmented reality interface (e.g., through the HMD) of the UE, or (3) virtual reality content to be presented via a virtual reality interface (e.g., through the HMD) of the wearable UE.

In one or more embodiments, the consumable content may be obtained from a predictive content management system, such as the predictive content management system 108 of FIG. 1, implemented on a server device(s), such as the server device(s) 102 of FIG. 1. For example, the predictive content management system may be implemented on an edge network of a cloud computing system. In one or more embodiments, the consumable content is created by the predictive content management system in response to receiving pose information from the UE. For example, the pose information may include current pose information and predictive pose information of the UE. In one or more embodiments, the predictive consumable content comprises predictive consumable content for two or more time periods spanning a length of a DRX cycle. For example, the predictive consumable content may include consumable content for three separate time periods as further explained above in connection to FIG. 2A-2C. In one or more embodiments, the predictive consumable content comprises consumable content outside of the predictive field-of-view. For example, instead of transmitting the predictive FOV the system will transmit a slightly larger consumable contents, comprising consumable content outside of the predictive FOV.

As further shown, the series of acts 400 may include an act 432 of receiving from a RAN a DRX configuration information comprising instructions for communicating with the wearable UE. For example, the DRX configuration information may include one or more of a length of the DRX cycle, a length of an active period of the DRX cycle, a length of an inactive period of the DRX cycle, and synchronization information for the start of the DRX cycle. In one or more embodiments, the RAN, such as the RAN 104 of FIG. 1, is implemented on an edge network of a cloud computing system. In one or more embodiments, the RAN includes a DRX coordinator, such as the DRX coordinator 129 of FIG. 1, wherein the DRX coordinator manages the DRX cycle between the RAN and the UE.

As further shown, the series of acts 400 may include an act 434 of stacking the consumable content based on the received DRX configuration information. For example, if the DRX cycle length is 30 ms, a content stacking manager, such as the content stacking manager 125 on FIG. 1, may stack consumable content to last at least 30 ms for each DRX cycle.

As further shown, the series of acts 400 may include an act 436 of transmitting the stacked content to the wearable UE. In one or more embodiments, a RAN allocates a quantity of communication resources for transmitting the stacked consumable content to the UE during an active DRX period indicated within the DRX configuration information. For example, the active period of DRX cycle may be included within the DRX configuration information. In one or more embodiments, the quantity of communication resources allocated by the RAN may be based on an indication of a quantity of the stacked consumable content received from the server device. In one or more embodiments, the stacked consumable content transmitted to the wearable UE includes consumable content to be displayed on the wearable UE over both active DRX period and inactive DRX period.

FIG. 5 illustrates an example series of acts 500 for delivering digital content to a UE. The digital content may be a full virtual environment or a combined real-world and computer-generated environment. As shown in FIG. 5, the series of acts 500 may include an act 538 of receiving for a UE, such as the UE 106 of FIG. 1, predictive pose information. For example, the pose information may include current pose information and predictive pose information of the UE.

As further shown, the series of acts 500 may include an act 540 of generating consumable content based on the received predictive pose information. In one or more embodiments, the consumable content is one or more of (1) mixed reality content to be presented via a mixed reality interface (e.g., through the HMD) of the UE, (2) augmented reality content to be presented via an augmented reality interface (e.g., through the HMD) of the UE, or (3) virtual reality content to be presented via a virtual reality interface (e.g., through the HMD) of the wearable UE. In one or more embodiments, the consumable content may be generated by a predictive content management system, such as the predictive content management system 108 of FIG. 1, implemented on a server device(s), such as the server device(s) 102 of FIG. 1. For example, the predictive content management system may be implemented on an edge network of a cloud computing system. In one or more embodiments, at least a portion of the generated consumable content may be a predictive consumable content. In one or more embodiments, the predictive consumable content comprises predictive consumable content for two or more time periods spanning a length of a DRX cycle. For example, the predictive consumable content may include consumable content for three separate time periods as further explained above in connection to FIG. 2A-2C. In one or more embodiments, the predictive consumable content comprises consumable content outside of a predictive field-of-view. For example, instead of transmitting the predictive FOV the system will transmit a slightly larger consumable content, comprising consumable content outside of the predictive FOV.

As further shown, the series of acts 500 may include an act 542 of receiving from a RAN a DRX configuration information comprising instructions for communicating with the wearable UE. For example, the DRX configuration information may include one or more of a length of the DRX cycle, a length of an active period of the DRX cycle, a length of an inactive period of the DRX cycle, and synchronization information for the start of the DRX cycle. In one or more embodiments, the RAN, such as the RAN 104 of FIG. 1, is implemented on an edge network of a cloud computing system. In one or more embodiments, the RAN includes a DRX coordinator, such as the DRX coordinator 129 of FIG. 1, wherein the DRX coordinator manages the DRX cycle between the RAN and the UE.

As further shown, the series of acts 500 may include an act 544 of stacking the consumable content based on the received DRX configuration information. For example, if the DRX cycle length is 30 ms, a content stacking manager, such as the content stacking manager 125 on FIG. 1, may stack consumable content to last at least 30 ms for each DRX cycle.

As further shown, the series of acts 500 may include an act 546 of transmitting the stacked content to the wearable UE. In one or more embodiments, a RAN allocates a quantity of communication resources for transmitting the stacked consumable content to the UE during an active DRX period indicated within the DRX configuration information. For example, the active period of DRX cycle may have been received within the DRX configuration information. In one or more embodiments, the quantity of communication resources allocated by the RAN may be based on an indication of a quantity of the stacked consumable content received from the server device. In one or more embodiments, the stacked consumable content transmitted to the wearable UE includes consumable content to be displayed on the wearable UE over both active DRX period and inactive DRX period until next active DRX period delivers new consumable content to the UE.

Figure 6:
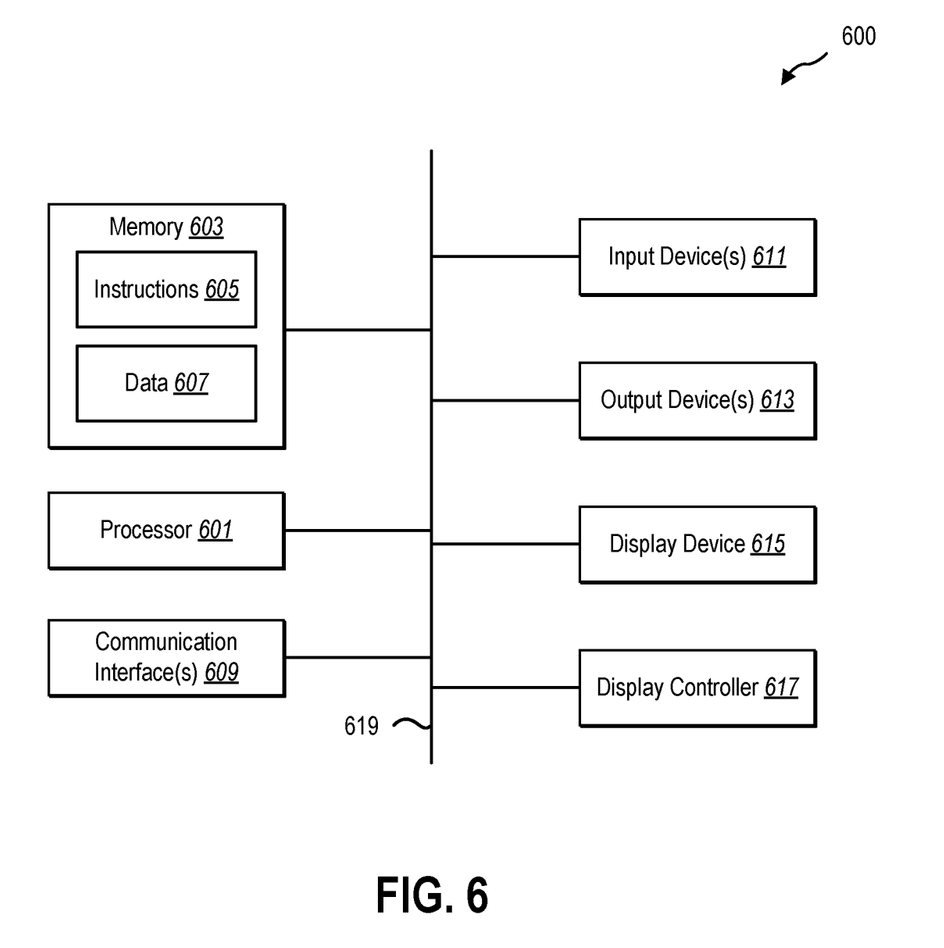
FIG. 6 illustrates certain components that may be included within a computer system.

FIG. 6 illustrates certain components that may be included within a computer system 600. One or more computer systems 600 may be used to implement the various devices, components, and systems described herein, such as the server device(s) 102 of FIG. 1, the predictive content management system 108 of FIG. 1, the RAN 104 of FIG. 1, and the UE 106.

The computer system 600 includes a processor 601. The processor 601 may be a general-purpose single-or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, an infrared (IR) communication port, or any 3GPP defined interface.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a fifth generation (5G) communication environment including a server device in communication with a wearable user equipment (UE), a method for delivering consumable content to the wearable UE, the method comprising:
   obtaining, by the server device, consumable content to be consumed on the wearable UE, wherein at least a portion of the consumable content comprises predictive consumable content;
   receiving, from a radio access network (RAN), discontinuous reception (DRX) configuration information, the DRX configuration information comprising communication instructions for communicating with the wearable UE;

stacking the consumable content based on the received DRX configuration information; and transmitting, from the server device and during an active DRX period indicated within the DRX configuration information, the stacked consumable content to the wearable UE.

2. The method of claim 1, wherein the predictive consumable content comprises consumable content to be presented on the UE over two or more time periods spanning a length of a DRX cycle.

3. The method of claim 1, wherein the predictive consumable content comprises consumable content outside of a predictive field-of-view.

4. The method of claim 1, wherein the stacked consumable content includes consumable content to be displayed on the wearable UE over both the active DRX period and an inactive DRX period.

5. The method of claim 1, wherein the consumable content is created based on a pose information received from the wearable UE, the pose information including current pose information and predictive pose information of the wearable UE.

6. The method of claim 5, wherein the current pose information and the predictive pose information is received from the wearable UE.

7. The method of claim 1, wherein the RAN allocates a quantity of communication resources for transmitting the stacked consumable content to the wearable UE during an active DRX period indicated within the DRX configuration information.

8. The method of claim 7, wherein the quantity of communication resources is determined based on an indication of a quantity of the stacked consumable content received from a server device.

9. The method of claim 1, wherein the consumable content is one or more of:
mixed reality content to be presented via a mixed reality interface of the wearable UE;
augmented reality content to be presented via an augmented reality interface of the wearable UE; or
virtual reality content to be presented via a virtual reality interface of the wearable UE.

10. The method of claim 1, wherein the RAN is implemented on an edge network of a cloud computing system.

11. In a fifth generation (5G) communication environment, a system for delivering digital content to a wearable user equipment (UE), the system including:
a wearable UE configured to provide pose information;
a radio access network (RAN) configured to provide discontinuous reception (DRX) configuration information, wherein the DRX configuration information comprises communication instructions for communicating with the wearable UE; and
a server device configured to generate consumable content to be presented on an interface of the wearable UE based on the pose information, wherein at least a portion of the consumable content comprises predictive consumable content, and wherein the server device is further configured to stack the consumable content based on the DRX configuration information and transmit the stacked consumable content to the wearable UE.

12. The system of claim 11, wherein the predictive consumable content comprises consumable content outside of a predictive field-of-view.

13. The system of claim 11, wherein the stacked consumable content includes consumable content to be displayed on the wearable UE over both an active DRX period and an inactive DRX period.

14. The system of claim 11, wherein the RAN allocates a quantity of communication resources for transmitting the stacked consumable content to the wearable UE during an active DRX period indicated within the DRX configuration information.

15. The system of claim 11, wherein the consumable content is one or more of:
mixed reality content to be presented via a mixed reality interface of the wearable UE;
augmented reality content to be presented via an augmented reality interface of the wearable UE; or
virtual reality content to be presented via a virtual reality interface of the wearable UE.

16. In a distributed computing environment including a server device on an edge network of a fifth generation (5G) communication environment, a method performed by the server device for delivering consumable content to a wearable user equipment (UE), the method comprising:
generating, by the server device, consumable content to be consumed on the wearable UE, wherein at least a portion of the consumable content comprises predictive consumable content;
receiving, from a radio access network (RAN) located at the edge network on a cloud computing system, discontinuous reception (DRX) configuration information, the DRX configuration information comprising communication instructions for communicating with the wearable UE;
stacking the consumable content based on the received DRX configuration information; and
transmitting, from the server device during an active DRX period indicated within the DRX configuration information, the stacked consumable content to the wearable UE.

17. The method of claim 16, wherein the predictive consumable content comprises consumable content outside of a predictive field-of-view.

18. The method of claim 16, wherein the stacked consumable content includes consumable content to be displayed on the wearable UE over both the active DRX period and an inactive DRX period.

19. The method of claim 16, wherein the RAN allocates a quantity of communication resources for transmitting the stacked consumable content to the wearable UE during an active DRX period indicated within the DRX configuration information.

20. The method of claim 16, wherein the consumable content is one or more of:
mixed reality content to be presented via a mixed reality interface of the wearable UE;
augmented reality content to be presented via an augmented reality interface of the wearable UE; or
virtual reality content to be presented via a virtual reality interface of the wearable UE.

* * * * *